(12) United States Patent
Grobman et al.

(10) Patent No.: US 9,177,129 B2
(45) Date of Patent: Nov. 3, 2015

(54) DEVICES, SYSTEMS, AND METHODS FOR MONITORING AND ASSERTING TRUST LEVEL USING PERSISTENT TRUST LOG

(75) Inventors: Steven L. Grobman, El Dorado Hills, CA (US); Uttam K. Sengupta, Portland, OR (US); Ryan Permeh, Trabuco Canyon, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/534,321

(22) Filed: Jun. 27, 2012
(Under 37 CFR 1.47)

(65) Prior Publication Data
US 2014/0006789 A1    Jan. 2, 2014

(51) Int. Cl.
*G06F 21/31* (2013.01)

(52) U.S. Cl.
CPC .................................. *G06F 21/316* (2013.01)

(58) Field of Classification Search
CPC ............... H04L 9/32; H04L 2209/127; H04L 29/06816; H04M 15/48; H04M 2215/0156; G06F 2211/009; G06F 21/57; G06F 21/316
USPC ......................................................... 713/176
See application file for complete search history.

(56) References Cited

U.S. PATENT DOCUMENTS

| | | | |
|---|---|---|---|
| 6,408,388 B1 * | 6/2002 | Fischer .......................... | 713/176 |
| 6,668,322 B1 * | 12/2003 | Wood et al. .................... | 713/182 |
| 7,047,560 B2 * | 5/2006 | Fishman et al. ................ | 726/6 |
| 7,076,655 B2 * | 7/2006 | Griffin et al. .................. | 713/164 |
| 7,086,085 B1 * | 8/2006 | Brown et al. .................... | 726/7 |
| 7,194,623 B1 | 3/2007 | Proudler et al. | |
| 7,275,102 B2 * | 9/2007 | Yeager et al. ................. | 709/224 |
| 7,353,531 B2 * | 4/2008 | Brown et al. ..................... | 726/1 |
| 7,363,493 B2 * | 4/2008 | Dotan ........................... | 713/167 |
| 7,853,998 B2 * | 12/2010 | Blaisdell et al. ................ | 726/12 |
| 8,499,045 B2 * | 7/2013 | Little et al. .................... | 709/206 |
| 8,800,003 B2 * | 8/2014 | Guo et al. ......................... | 726/4 |
| 2001/0039565 A1 * | 11/2001 | Gupta ........................... | 709/203 |
| 2003/0041255 A1 * | 2/2003 | Chen et al. .................... | 713/193 |
| 2003/0172090 A1 * | 9/2003 | Asunmaa et al. ............. | 707/200 |
| 2003/0187794 A1 * | 10/2003 | Irwin et al. ...................... | 705/40 |
| 2003/0236975 A1 * | 12/2003 | Birk et al. ..................... | 713/156 |
| 2004/0088578 A1 * | 5/2004 | Chao et al. .................... | 713/201 |
| 2004/0243801 A1 * | 12/2004 | Chen et al. .................... | 713/160 |

(Continued)

FOREIGN PATENT DOCUMENTS

WO    WO 0073880 A1 * 12/2000
WO    2014004128 A1    1/2014

OTHER PUBLICATIONS

McCune et al., "Flicker: An Execution Infrastructure for TCB Minimization", 2008.*

(Continued)

*Primary Examiner* — O. C. Vostal
(74) *Attorney, Agent, or Firm* — Barnes & Thornburg LLP

(57) ABSTRACT

Devices, systems, and methods for monitoring and asserting a trust level of a computing device are disclosed. In one illustrative embodiment, a computing device may include a memory having stored therein a persistent trust log, the persistent trust log comprising data relating to historic events influencing a trust level of the computing device, and a security controller configured to detect an event that influences the trust level of the computing device and to write data relating to the event to the persistent trust log.

23 Claims, 4 Drawing Sheets

(56) References Cited

U.S. PATENT DOCUMENTS

| | | | |
|---|---|---|---|
| 2005/0005161 A1* | 1/2005 | Baldwin | 713/200 |
| 2005/0120219 A1* | 6/2005 | Munetoh et al. | 713/176 |
| 2006/0174037 A1* | 8/2006 | Bernardi et al. | 709/245 |
| 2006/0224742 A1 | 10/2006 | Shahbazi | |
| 2006/0282896 A1* | 12/2006 | Qi | 726/25 |
| 2007/0094711 A1* | 4/2007 | Corley et al. | 726/3 |
| 2007/0118769 A1* | 5/2007 | England et al. | 713/193 |
| 2007/0213259 A1* | 9/2007 | Landry et al. | 514/9 |
| 2007/0245018 A1* | 10/2007 | Bhola et al. | 709/225 |
| 2007/0261112 A1* | 11/2007 | Todd et al. | 726/11 |
| 2007/0271189 A1 | 11/2007 | Morten et al. | |
| 2008/0028453 A1* | 1/2008 | Nguyen et al. | 726/9 |
| 2008/0256548 A1* | 10/2008 | Branson et al. | 718/106 |
| 2009/0007247 A1* | 1/2009 | Ellison et al. | 726/6 |
| 2009/0037976 A1* | 2/2009 | Teo et al. | 726/1 |
| 2009/0049523 A1* | 2/2009 | LiVecchi et al. | 726/4 |
| 2009/0132813 A1* | 5/2009 | Schibuk | 713/158 |
| 2009/0210705 A1* | 8/2009 | Chen | 713/158 |
| 2009/0323972 A1* | 12/2009 | Kohno et al. | 380/284 |
| 2010/0017853 A1* | 1/2010 | Readshaw | 726/3 |
| 2010/0031345 A1* | 2/2010 | Sinclair | 726/19 |
| 2010/0115040 A1* | 5/2010 | Sargent et al. | 709/206 |
| 2010/0186078 A1* | 7/2010 | Napoli et al. | 726/9 |
| 2010/0241595 A1* | 9/2010 | Felsher | 705/400 |
| 2010/0242102 A1* | 9/2010 | Cross et al. | 726/7 |
| 2010/0274902 A1* | 10/2010 | Penman et al. | 709/227 |
| 2010/0281273 A1* | 11/2010 | Lee et al. | 713/190 |
| 2010/0318782 A1 | 12/2010 | Auradkar et al. | |
| 2010/0332820 A1* | 12/2010 | Matsushima et al. | 713/150 |
| 2011/0010762 A1* | 1/2011 | Nijdam et al. | 726/5 |
| 2011/0023106 A1* | 1/2011 | Murotake et al. | 726/11 |
| 2011/0179477 A1* | 7/2011 | Starnes et al. | 726/9 |
| 2011/0225427 A1* | 9/2011 | Wood et al. | 713/176 |
| 2012/0036581 A1* | 2/2012 | Maximilien et al. | 726/26 |
| 2012/0066508 A1 | 3/2012 | Lentini | |
| 2012/0260307 A1* | 10/2012 | Sambamurthy et al. | 726/1 |
| 2012/0297187 A1* | 11/2012 | Paya et al. | 713/156 |
| 2013/0053135 A1* | 2/2013 | King | 463/27 |
| 2013/0166899 A1* | 6/2013 | Courtney et al. | 713/100 |
| 2013/0191924 A1* | 7/2013 | Tedesco et al. | 726/26 |
| 2013/0198811 A1* | 8/2013 | Yu et al. | 726/4 |
| 2013/0326614 A1* | 12/2013 | Truskovsky et al. | 726/19 |
| 2014/0101734 A1* | 4/2014 | Ronda et al. | 726/5 |

OTHER PUBLICATIONS

Canedo et al., "File Exchange in a Private Cloud supported by a Trust Model", 2012.*

Dyer et al., "Building the IBM 4758 Secure Coprocessor", 2001.*

International Search Report and Written Opinion received for PCT International Patent Application No. PCT/US2013/045895, mailed on Oct. 15, 2013, 10 pages.

* cited by examiner

DEVICES, SYSTEMS, AND METHODS FOR MONITORING AND ASSERTING TRUST LEVEL USING PERSISTENT TRUST LOG

BACKGROUND

The trust level of a computing device (e.g., a personal computer, a workstation, a laptop computer, a handheld computer, a mobile internet device, a cellular phone, a personal data assistant, a telephony device, a network appliance, a virtualization device, a storage controller, or other computer-based device) may be a decision criterion for allowing the computing device to participate in various activities and/or transactions. By way of illustrative example, the trust level of a computing device may be a factor in determining whether to allow the computing device to process and/or store sensitive data (e.g., corporate records) or whether to allow the computing device to execute sensitive transactions (e.g., financial transactions). It will be appreciated that the trust level of a computing device may be relevant to many other types of activities and/or transactions.

Many events that a computing device participates in over its lifecycle may influence the trust level of the computing device. For instance, a new smart phone that has just been unboxed will have a higher trust level than a three year old smart phone that has been "jailbroken" (i.e., a process allowing a user access to system resources and/or privileges not intended by the smart phone developer), restored multiple times, and had several applications from untrustworthy sources installed. Malicious software may attempt to hide events that negatively influence the trust level of a computing device (e.g., jailbreaking) and to misrepresent the trust level of the computing device as high.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
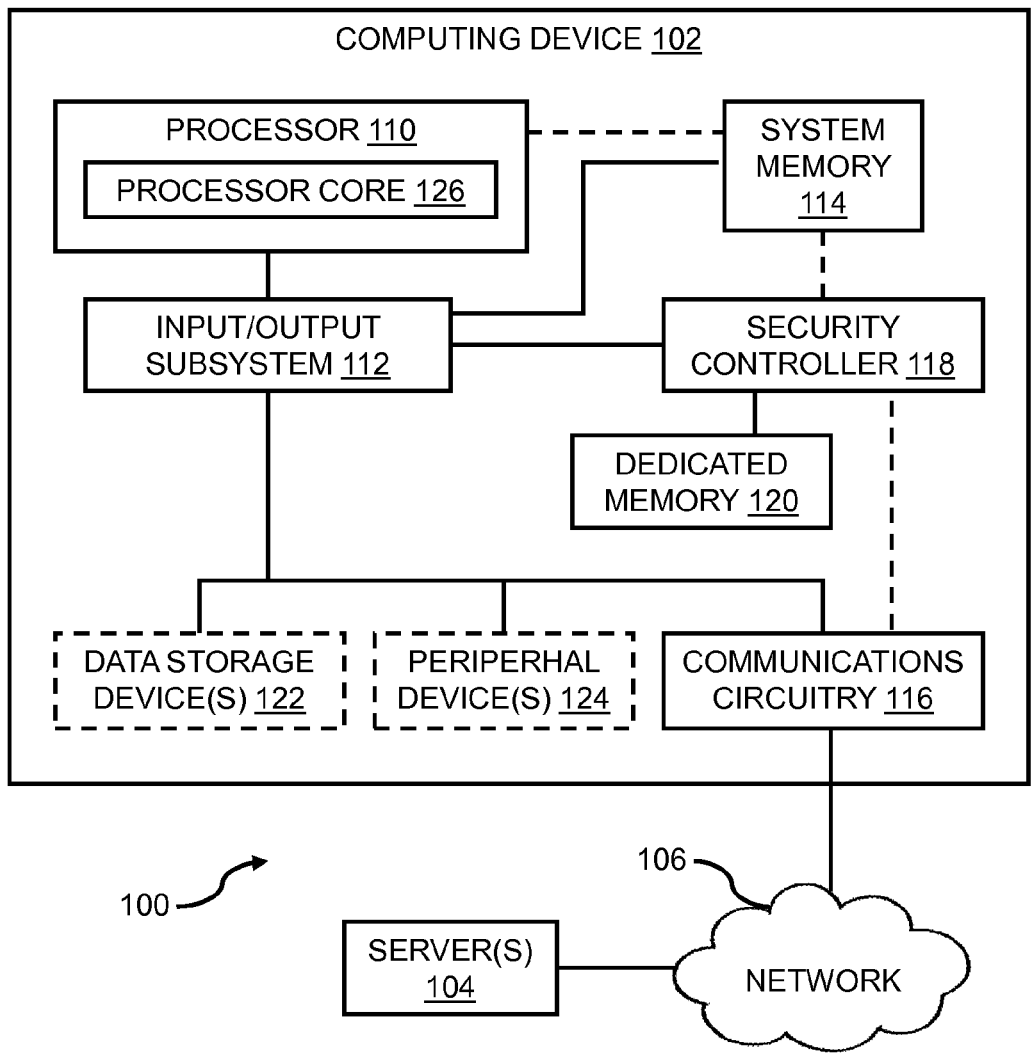
FIG. 1 is a simplified block diagram of at least one embodiment of a system for monitoring and asserting a trust level of a computing device using a persistent trust log.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits, and full software instruction sequences have not been shown in detail in order not to obscure the description of the concepts described herein. Those of ordinary skill in the art, with the included descriptions, will be able to implement appropriate functionality without undue experimentation.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computing device may include one or more point-to-point or bus-based interconnects between components. Embodiments of the concepts described herein may also be implemented as instructions carried by or stored on one or more machine-readable or computer-readable storage media, which may be read and executed by one or more processors or controllers. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

The present disclosure relates to devices, systems, and methods for monitoring and asserting a trust level of a computing device using a persistent trust log. As used herein, the term "persistent" refers to data that is maintained even when a computing device is re-imaged with a new software stack. The presently disclosed devices, systems, and methods utilize a security engine (e.g., a security controller) of a computing device to monitor the trust level of the computing device by storing data relating to events that influence the trust level in a persistent trust log. The use of the security engine and the persistent trust log advantageously provides a tamper resistant mechanism for monitoring the trust level of the computing device that may not be manipulated by low-level malicious software (e.g., kernel mode rootkits) or software re-imaging.

The presently disclosed devices, systems, and methods may also utilize the security engine and the persistent trust log to assert the trust level of the computing device when requested by an external service. By analyzing data stored in the persistent trust log, the security engine may generate a trust assessment, which may be used by the external service as a decision criterion for allowing the computing device to participate in various activities and/or transactions. Advantageously, the trust assessment generated by the security engine may be responsive to one or more criteria provided by the external service. Furthermore, the trust assessment generated by the security engine may provide a secure mechanism for asserting the trust level of the computing device without revealing to an external service the events underlying the trust assessment (i.e., the data stored in the persistent trust log), which may be sensitive from a privacy and/or security perspective.

Referring now to FIG. 1, one illustrative embodiment of a system 100 for monitoring and asserting a trust level of a computing device 102 using a persistent trust log is shown as a simplified block diagram. The system 100 includes the computing device 102, one or more servers 104, and a network 106 communicatively coupling the computing device 102 and the one or more servers 104. It is contemplated that the computing device 102 may communicate with any number of servers 104 as part of the system 100. In some embodiments, the computing device 102 and the one or more servers 104 may be remote from one another (e.g., located in different rooms, buildings, cities, states, or countries). The network 106 may be embodied as any type of wired and/or wireless network such as a local area network, a wide area network, a publicly available global network (e.g., the Internet), or other network. The network 106 may include any number of additional devices to facilitate communications between the computing device 102 and the one or more servers 104, such as routers, switches, intervening computers, and the like.

The computing device 102 may be embodied as any type of electronic device capable of performing the functions described herein. By way of example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, the computing device 102 includes a processor 110, an input/output (I/O) subsystem 112, a system memory 114, communications circuitry 116, a security controller 118, and a dedicated memory 120. As shown in phantom in FIG. 1, the computing device 102 may also optionally include one or more data storage devices 122 and one or more peripheral devices 124. It will be appreciated that, in some embodiments, the computing device 102 may not include all of the foregoing components. Furthermore, it should be appreciated that the computing device 102 may include other components, sub-components, and devices commonly found in a computer and/or computing device, which are not illustrated in FIG. 1 for clarity of the description.

The processor 110 of the computing device 102 may be any type of processor capable of executing software/firmware, such as a microprocessor, digital signal processor, microcontroller, or the like. The processor 110 functions as a primary processor (or central processing unit) of the computing device 102 and is generally responsible for executing a software stack, which may include a host operating system and various applications, programs, libraries, and drivers resident on the computing device 102. As shown in FIG. 1, the processor 110 is illustratively embodied as a single core processor having a processor core 126. However, in other embodiments, the processor 110 may be embodied as a multi-core processor having multiple processor cores 126. Furthermore, the computing device 102 may include additional processors 110 having one or more processor cores 126.

The processor 110 is communicatively coupled to the I/O subsystem 112 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like. The I/O subsystem 112 of the computing device 102 may be embodied as circuitry and/or components to facilitate input/output operations with the processor 110 and/or other components of the computing device 102. In some embodiments, the I/O subsystem 112 may be embodied as a memory controller hub (MCH or "northbridge"), an input/output controller hub (ICH or "southbridge"), and a firmware device. In other embodiments, I/O subsystems having other configurations may be used. For example, in some embodiments, the I/O subsystem 112 may be embodied as a platform controller hub (PCH). In such embodiments, the memory controller hub (MCH) may be incorporated in or otherwise associated with the processor 110, and the processor 110 may communicate directly with the system memory 114 (as shown by the hashed line in FIG. 1). In still other embodiments, the I/O subsystem 112 may form a portion of a system-on-a-chip (SoC) and be incorporated, along with the processor 110 and other components of the computing device 102, on a single integrated circuit chip.

The system memory 114 of the computing device 102 is also communicatively coupled to the I/O subsystem 112 via a number of signal paths. The system memory 114 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 114 is illustrated in FIG. 1, in other embodiments, the computing device 102 may include additional system memory devices. In some embodiments, the system memory 114 may be utilized as a shared memory that is accessible to additional processors of the computing device 102 (such as the security controller 118, by way of example).

The communications circuitry 116 of computing device 102 may be embodied as any number of devices and circuitry for enabling communications between the computing device 102 and the network 106. The communications circuitry 116 may include one or more wired and/or wireless network interfaces to facilitate communications over the wired and/or wireless portions of the network 106. The communications circuitry 116 is communicatively coupled to the I/O subsystem 112 via a number of signal paths.

The computing device 102 also includes a security controller 118, which is distinct from and may operate independently of the processor 110. The security controller 118 may be embodied as any type of processor capable of executing software/firmware, such as a microprocessor, digital signal processor, microcontroller, or the like, including one or more processors having one or more processor cores (not shown). In the illustrative embodiment of FIG. 1, the security controller 118 is embodied as one or more separate integrated circuits that are communicatively coupled to the I/O subsystem 112 via a number of signal paths. In other embodiments, the security controller 118 may be integrated into the I/O subsystem 112. The security controller 118 may communicate with various components of the computing device 102 via the I/O subsystem 112. Additionally or alternatively, the security controller 118 may independently communicate with various components of the computing device 102 (e.g., the system memory 114 and the communication circuitry 116) via a number of signal paths, as shown in phantom in FIG. 1. In the illustrative embodiment, the security controller 118 is also communicatively coupled to a dedicated memory 120 that is accessible only to the security controller 118. In some embodiments, the dedicated memory 120 may be incorporated in the security controller 118.

The security controller 118 may be configured for managing particular functions of the computing device 102 irrespective of the operational state of the processor 110 or of the host operating system of the computing device 102. To facilitate such independent operation, the security controller 118 may be provided with an independent connection to the power circuitry (not shown) of the computing device 102, allowing the security controller 118 to retain power even when other components of the computing device 102 are powered down or turned off. Furthermore, the security controller 118 may be provided with one or more independent network interfaces via communication circuitry 116, which is also provided with an independent connection to the power circuitry (not shown), allowing out-of-band communications over the network 106. In other words, the security controller 118 is able to communicate directly with devices on the network 106 (e.g., the one or more servers 104), with or without the host operating system executing on the processor 110. In summary, the security controller 118 may operate intelligently based on incoming requests/commands and communicate across the network 106 whether the processor 110 is turned off, running on standby, being initialized, or in regular operation and whether the host operating system is booting, running, crashed, or otherwise. In some illustrative embodiments, the security controller 118 may be implemented using an Intel® Management Engine, available from Intel Corporation of Santa Clara, Calif., and/or within chipsets sold by Intel Corporation.

In some embodiments, the computing device 102 may optionally include one or more data storage devices 122. The data storage device(s) 122 may be embodied as any type of devices configured for the short-term or long-term storage of data such as, for example, memory devices and circuits, memory cards, hard disk drives, solid-state drives, or other data storage devices. Each of the data storage device(s) 122 may be communicatively coupled to the I/O subsystem 112 via a number of signal paths, allowing the I/O subsystem 112 to receive inputs from and send outputs to the data storage device(s) 122.

The computing device 102 may also optionally include one or more peripheral devices 124. The peripheral device(s) 124 may illustratively include a display, a touchpad, a touchscreen, a keyboard, a mouse, a microphone, and/or one or more external speakers, among other peripheral devices. The particular number and type of devices included in the peripheral device(s) 124 of the computing device 102 may depend upon, for example, the intended use of the computing device 102 (e.g., as a desktop computing device or a mobile computing device). Each of the peripheral device(s) 124 may be communicatively coupled to the I/O subsystem 112 via a number of signal paths, allowing the I/O subsystem 112 to receive inputs from and send outputs to the peripheral device(s) 124.

Figure 2:
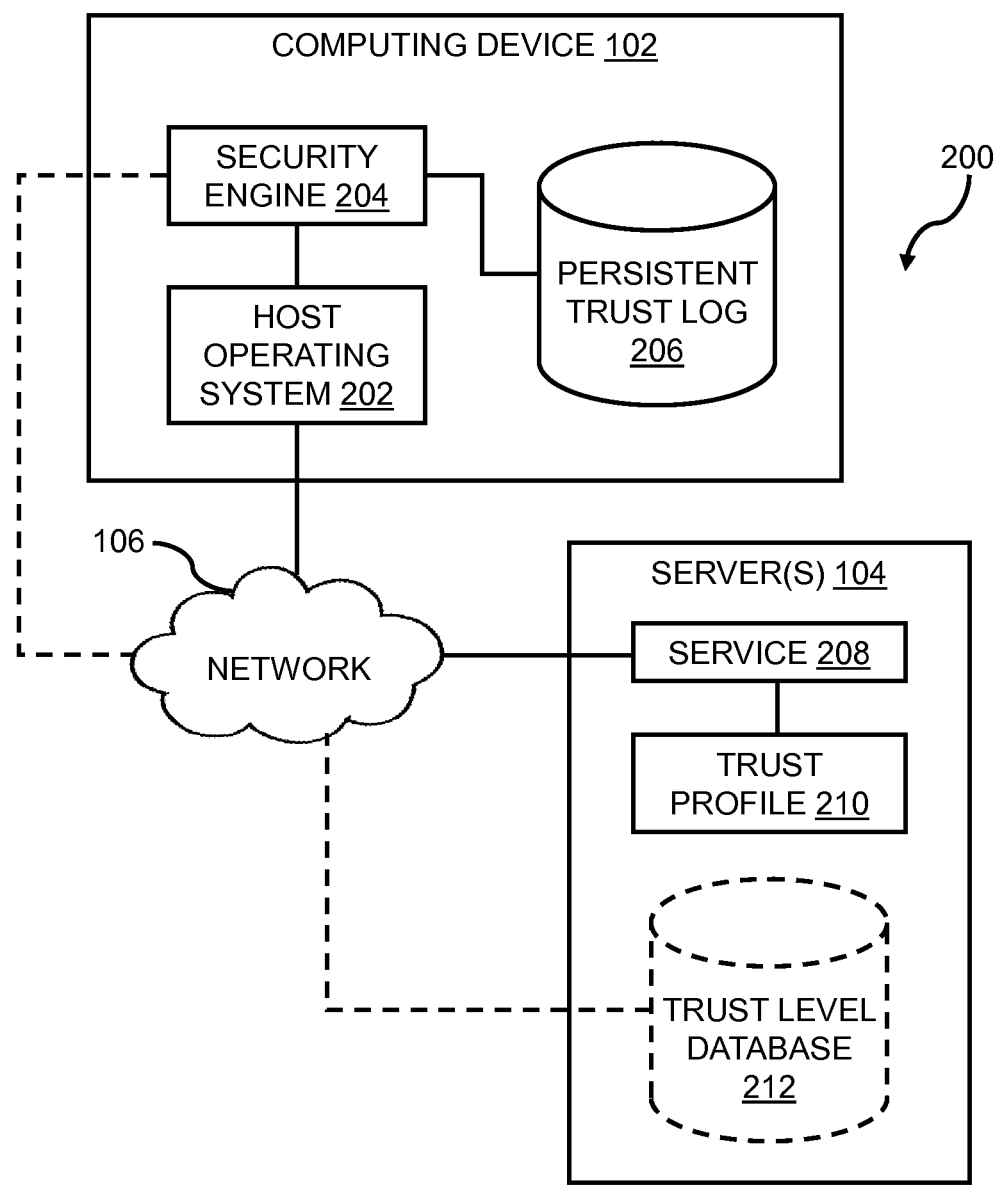
FIG. 2 is a simplified block diagram of at least one embodiment of an environment of the system of FIG. 1.

Referring now to FIG. 2, one illustrative embodiment of an environment 200 of the system 100 is shown as a simplified block diagram. As discussed above, the system 100 includes the computing device 102 and one or more servers 104, communicatively coupled to one another via a network 106. The computing device 102 includes a host operating system 202 (executing on the processor 110), a security engine 204, and a persistent trust log 206. The one or more servers 104 may include an external service 208 utilized by the computing device 102, a trust profile 210, and, in some embodiments, a trust level database 212. The external service 208, the trust profile 210, and the trust level database 212 may reside on the same server 104 or on multiple servers 104 (including, but not limited to, the external service 208 being executed on one server 104, the trust profile 210 being stored on another server 104, and the trust level database 212 being stored on yet another server 104).

The security engine 204 of the computing device 102 may be embodied as any number of hardware components, firmware components, and/or software components. For instance, in some illustrative embodiments (such as that shown in FIG. 1), the security engine 204 may be embodied as a security controller 118 (e.g., a microprocessor, a digital signal processor, a microcontroller, or the like) of the computing device 102. In other illustrative embodiments, the security engine 204 may be embodied as one or more firmware and/or software modules that are executed by the processor 110 and/or the I/O subsystem 112 of the computing device 102 as a secure execution environment. As shown in FIG. 2, the security engine 204 of the computing device 102 may communicate with the one or more servers 104 over the network 106 by sending and receiving data via the host operating system 202. In some embodiments, the security engine 204 may additionally or alternatively communicate with the one or more servers 104 over the network 106 using out-of-band communications (as indicated in phantom in FIG. 2). As will be further described below with reference to FIGS. 3 and 4, the security engine 204 may operate to monitor and/or assert a trust level of the computing device 102.

The computing device 102 further includes a persistent trust log 206, which may be implemented using any suitable electronic data structure or arrangement, such as a register, data store, table, record, array, index, hash, map, tree, list, graph, file (of any file type), folder, directory, database, or the like. In the illustrative embodiment, the persistent trust log 206 comprises data relating to historic events that influence the trust level of the computing device 102. By way of illustrative example, the persistent trust log 206 may include data relating to applications installed on the computing device 102, networks 106 to which the computing device 102 was connected, websites accessed by the computing device 102, and other actions performed on or with the computing device 102 (e.g., "jailbreaks"). As will be further described below with reference to FIG. 3, the security engine 204 may write data relating to such events to the persistent trust log 206. In some embodiments, the data stored in the persistent trust log 206 may be modifiable only by the security engine 204. For instance, the persistent trust log 206 may be stored on a dedicated memory 120 that is accessible only to the security engine 204. In other embodiments, the persistent trust log 206 may be stored on a portion of the system memory 114 (or a data storage device 122) that may only be written to only by the security engine 204.

The host operating system 202 of the computing device 102 (or an application running thereon) may seek to interact with an external service 208 executing on the one or more servers 104. By way of illustrative example, the host operating system 202 may request data (e.g., corporate records) from an enterprise rights management service 208. Before allowing access to any sensitive data, the external service 208 may desire to assess the trust level of the computing device 102. As will be further described below with reference to FIG. 4, the external service 208 may interact with the security engine 204 to obtain a trust assessment representing the trust level of the computing device 102. In some embodiments, the external service 208 may provide a trust profile 210 to the security engine 204 that includes one or more criteria for generating the trust assessment (e.g., whether the computing device 102 has ever been "jailbroken"). The trust profile 210 may include criteria specific to the external service 208 requesting the trust assessment. In other embodiments, the trust profile 210 may include industry-standard criteria for the type of external service 208 (e.g., a banking trust profile 210 including one or more criteria relating to the trust level required of the computing device 102 to participate in financial transactions). In some embodiments, the one or more servers 104 may also store a trust level database 212 that may be accessed by the security engine 204 (over the network 106). The trust level database 212 may include information regarding how one or more events might influence the trust level of the computing device 102 (e.g., the impact of installing a particular application on the trust level of the computing device 102).

Figure 3:
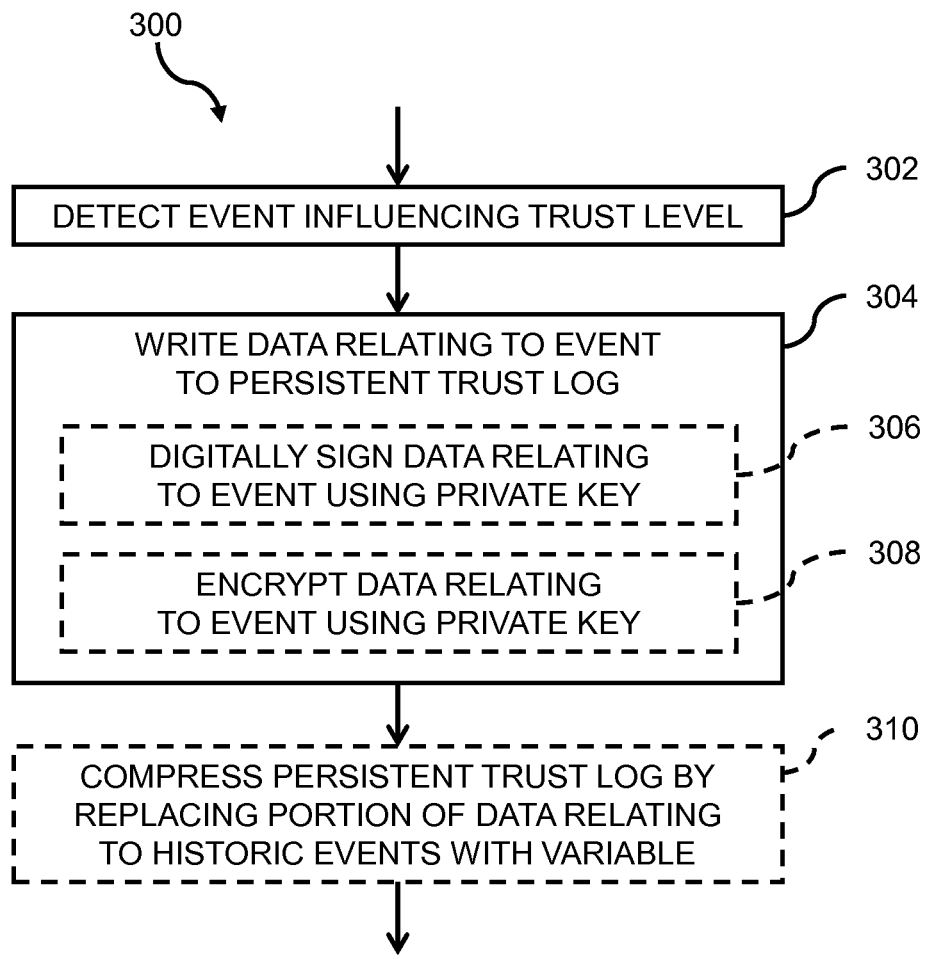
FIG. 3 is a simplified flow diagram of at least one embodiment of a method for monitoring a trust level of a computing device, such as the computing device of FIG. 1.

Referring now to FIG. 3, one illustrative embodiment of a method 300 for monitoring the trust level of the computing device 102 is shown as a simplified flow diagram. In the illustrative embodiment, the method 300 may be executed by the security engine 204 of the computing device 102, in conjunction with one or more other components of the computing device 102. The method 300 is illustrated as a number of blocks 302-310 in FIG. 3. Blocks 306-310 may be optionally employed in some embodiments of the method 300 and are, therefore, indicated in phantom in FIG. 3.

The method 300 begins with block 302 in which the security engine 204 detects an event that influences the trust level of the computing device 102. By way of illustrative example, the security engine 204 may detect in block 302 that a particular application has been installed on the computing device 102, that the computing device 102 has been connected to a particular network 106, that the computing device 102 has accessed a particular website, or that some other action has been performed on or with the computing device 102 (e.g., a "jailbreak"). In some embodiments, the security engine 204 may actively monitor the other components of the computing device 102 (e.g., the host operating system 202, the communications circuitry 116, etc.) and directly detect the event influencing the trust level of the computing device 102. It is also contemplated that the security engine 204 may be informed of such an event by another component of the computing device 102 in block 302.

After block 302, the method 300 proceeds to block 304 in which the security engine 204 writes data relating to the event detected in block 302 to the persistent trust log 206. For instance, the security engine 204 may write data regarding the type of event ("Application X Installed," "Connected to Network Y," "Accessed Dangerous Site Z," "Jailbreak Detected," etc.), the date and time of the event, and/or other information relating to the event, to the persistent trust log 206. Block 304 may be performed each time an event that influences the trust level of the computing device 102 is detected in block 302. As such, the persistent trust log 206 comprises a record of the historic events that influence the trust level of the computing device 102.

In some embodiments, block 304 of the method 300 may involve block 306 in which the security engine 204 digitally signs the data written to the persistent trust log 206 using a private key. This private key is known only to the security engine 204 and, thus, block 306 provides a mechanism for later confirming the authenticity of data stored in the persistent trust log 206 (i.e., a mechanism for later determining whether data stored in the persistent trust log 206 was written to the persistent trust log 206 by the security engine 204). In other embodiments, block 304 of the method 300 may involve block 308 in which the security engine 204 encrypts the data written to the persistent trust log 206 using the private key. Again, this private key is known only to the security engine 204 and, thus, block 308 prevents other components of the computer device 102 from being able to read the data stored in the persistent trust log 206.

After block 304, the method 300 may optionally proceed to block 310 in which the security engine 204 compresses the persistent trust log 206. This compression may allow the security engine 204 to limit the amount of memory space needed for the persistent trust log 206 over the lifecycle of the device. The security engine 204 may compress the persistent trust log 206 by replacing a portion of the data in the persistent trust log 206 with a variable summarizing that portion of the data. In some embodiments, this variable may be a quantitative value (e.g., 1-10) representing the overall trust level of the summarized data. In other embodiments, this variable may be a qualitative descriptor (e.g., high, medium, low) representing the overall trust level of the summarized data. By way of illustrative example, the security engine 204 may maintain the previous six months of data in full detail, while summarizing all older data into an overall trust level variable. It will be appreciated that, where employed, block 310 may be performed as frequently or infrequently as desired to limit the amount of memory space needed to store the persistent trust log 206.

Figure 4:
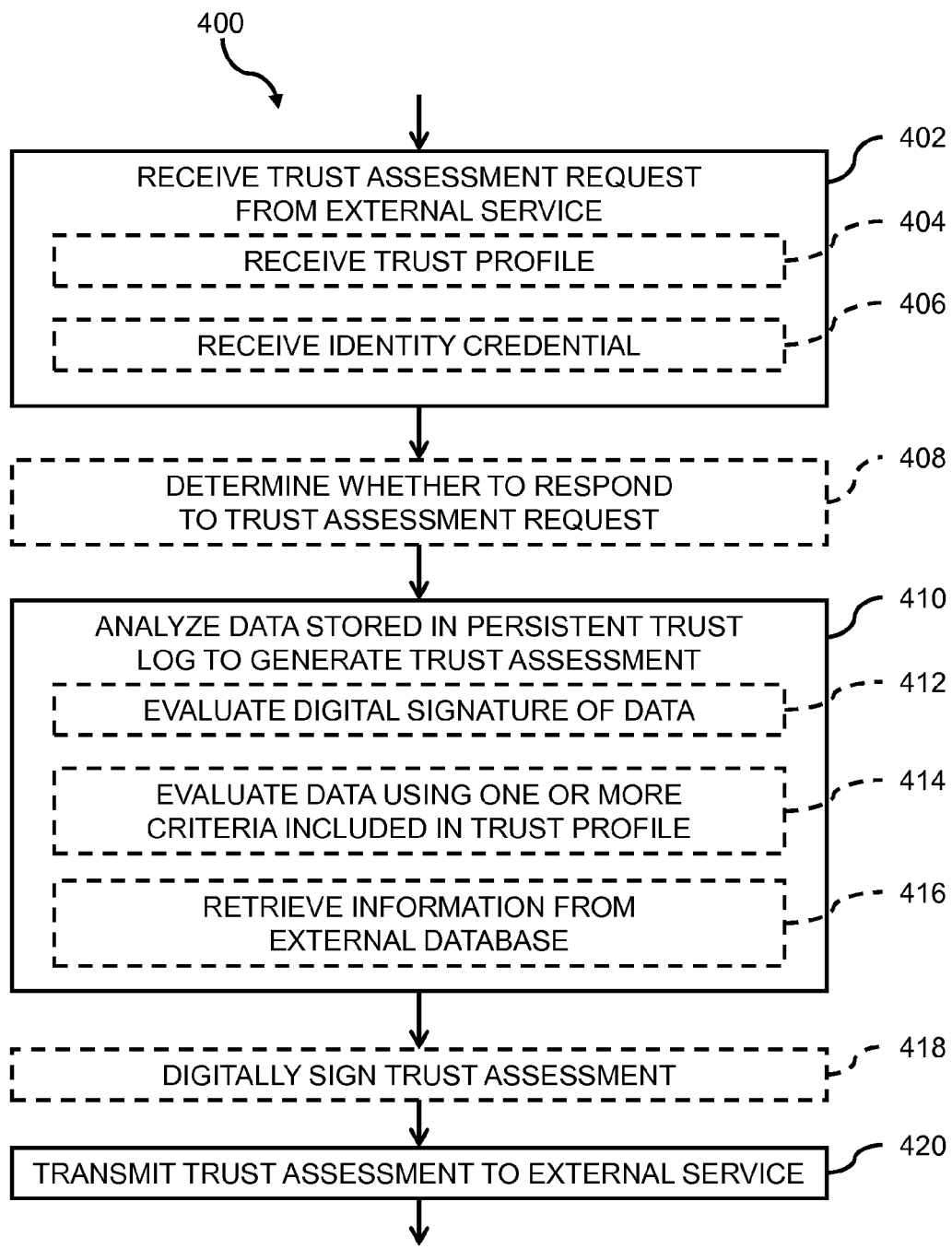
FIG. 4 is a simplified flow diagram of at least one embodiment of a method for asserting a trust level of a computing device, such as the computing device of FIG. 1.

Referring now to FIG. 4, one illustrative embodiment of a method 400 for asserting the trust level of the computing device 102 is shown as a simplified flow diagram. In the illustrative embodiment, the method 400 may be executed by the security engine 204 of the computing device 102, in conjunction with one or more other components of the computing device 102. The method 400 is illustrated as a number of blocks 402-420 in FIG. 3. Blocks 404-408 and blocks 412-418 may be optionally employed in some embodiments of the method 400 and are, therefore, indicated in phantom in FIG. 4.

The method 400 begins with block 402 in which the security engine 204 receives a trust assessment request originating from an external service 208. As discussed above, an external service 208 may desire to assess the trust level of a computing device 102 before allowing the computing device 102 to perform some activity and/or transaction with the external service 208. In such situations, the external service 208 may transmit a trust assessment request to the security engine 204, either directly or via the host operating system 202. In some embodiments, block 402 may involve block 404 in which the security engine 204 receives a trust profile 210 from the external service 208, along with the trust assessment request. The trust profile 210 may include one or more criteria to be used by the security engine 204 when generating the trust assessment. In some embodiments, block 402 may also involve block 406 in which the security engine 204 receives an identity credential from the external service 208, along with the trust assessment request. This identity credential may be used by the security engine 204 to confirm the identity of the external service 208 requesting the trust assessment.

After block 402, the method 400 may optionally proceed to block 408 in which the security engine 204 determines whether to respond to the trust assessment request received in block 402. In some embodiments of block 408, the security engine 204 may evaluate the identity credential received in block 406 to determine whether to respond to the trust assessment request. For instance, if the security engine 204 does not trust the external service 208 (or does not otherwise wish to provide a trust assessment to the external service 208), the method 400 may be aborted in block 408. In other embodiments of block 408, the security engine 204 may evaluate whether providing the trust assessment to the external service 208 would reveal the historic events influencing the trust level of the computing device 102 (in an undesirable manner). For instance, if generating a trust assessment using the trust profile 210 received in block 404 would compromise the privacy or security of a user of the computing device 102, the method 400 may be aborted in block 408. It is contemplated that block 408 may be optionally performed by the security engine 204 at any time prior to transmitting the trust assessment to the external service 208 (i.e., block 420 of the method 400), including after generating the trust assessment in block 410.

After block 402 (or, where employed, after block 408), the method 400 proceeds to block 410 in which the security engine 204 generates a trust assessment by analyzing data stored in the persistent trust log 206. During block 410, the security engine 204 may map the data stored in the persistent trust log 206 to the criteria defining the trust assessment. In the illustrative embodiment, the security engine 204 generates a trust assessment that represents the trust level of the computing device 102 but does not reveal the particular historic events influencing the trust level of the computing device 102. For instance, the trust assessment generated in block 410 may be a quantitative value (e.g., 1-10) representing the overall trust level of the computing device 102. In other embodiments, the trust assessment generated in block 410 may be a qualitative descriptor (e.g., high, medium, low) representing the overall trust level of the computing device 102. As described below, the security engine 204 may perform one or more of blocks 412-416 when generating the trust assessment in block 410.

In some embodiments, block 410 of the method 400 may involve block 412 in which the security engine 204 evaluates a digital signature to determine whether the data was written to the persistent trust log 206 by the security engine 204. As discussed above, when writing data to the persistent trust log 206 (in block 304 of the method 300), the security engine 204 may digitally sign (or encrypt) the data using a private key. In block 412 of the method 400, the security engine 204 may use this private key to evaluate the digital signature on the data stored in the persistent trust log 206. If the digital signature corresponds to the private key of the security engine 204 (after suitable processing), the security engine 204 may confirm that the data stored in the persistent trust log 206 was, in fact, written to the persistent trust log 206 by the security engine 204.

In other embodiments, block 410 of the method 400 may involve block 414 in which the security engine 204 evaluates the data stored in the persistent trust log 206 using one or more criteria included in a trust profile 210 received from the external service 208 originating the trust assessment request. As discussed above, block 410 may involve the security engine 204 mapping data stored in the persistent trust log 206 to criteria defining the trust assessment. Where a trust profile 210 is received from the external service 208 in block 404, the one or more criteria included in the trust profile 210 may be used as the criteria for analyzing the data stored in the persistent trust log 206 in block 410. Block 414 may allow an external service 208 to specify what events should be considered important for a particular trust assessment request via the trust profile 210.

In still other embodiments, block 410 of the method 400 may involve block 416 in which the security engine 204 retrieves information from an external database 212 regarding how one or more of the historic events influence the trust level of the computing device 102. During block 416, the security engine 204 may set up a secure link with the trust level database 212 to analyze how a particular event recorded in the persistent trust log 206 should impact the trust assessment generated in block 410. For instance, the trust level database 212 may include up-to-date information on the trustworthiness of various applications, networks, and websites.

After block 410, the method 400 may optionally proceed to block 418 in which the security engine 204 digitally signs the trust assessment. In some embodiments, the security engine 204 may digitally sign the trust assessment with a timestamp in block 418 to ensure that the trust assessment is not used to represent the trust level of the computing device 102 at a later point in time, at which point the trust assessment may not be accurate. In other embodiments, the security engine 204 may digitally sign the trust assessment with an anonymous attestation credential (e.g., an Enhanced Privacy ID) in block 418 to prove that the trust assessment was generated by the security engine 204, without revealing the identity of a user of the computing device 102.

After block 410 (or, where employed, after block 418), the method 400 proceeds to block 410 in which the security engine 204 transmits the trust assessment to the external service 208 originating the trust assessment request. Where the trust assessment is digitally signed in block 418, the external service 208 may use this information to confirm the authenticity of the trust assessment. The external service 208 may then use the trust assessment to determine whether to allow the computing device 102 to perform some activity and/or transaction with the external service 208.

EXAMPLES

Illustrative examples of the devices, systems, and methods disclosed herein are provided below. An embodiment of the devices, systems, and methods may include any one or more, and any combination of, the examples described below.

In one example, a computing device having a trust level may comprise a memory having stored therein a persistent trust log, the persistent trust log comprising data relating to historic events influencing the trust level of the computing device, and a security controller configured to detect an event that influences the trust level of the computing device and to write data relating to the event to the persistent trust log.

In an example, data stored in the persistent trust log may be modifiable only by the security controller. In an example, the memory may be a dedicated memory device accessible only to the security controller. In an example, the security controller may be further configured to digitally sign the data relating to the event using a private key when writing the data relating to the event to the persistent trust log. In an example, the security controller may be further configured to encrypt the data relating to the event using a private key when writing the data relating to the event to the persistent trust log. In an example, the security controller may be further configured to compress the persistent trust log by replacing a portion of the data relating to historic events influencing the trust level of the computing device with a variable summarizing the portion of the data.

In an example, the security controller may be further configured to analyze data stored in the persistent trust log to generate a trust assessment in response to receiving a trust assessment request. In an example, the trust assessment may not reveal the historic events influencing the trust level of the computing device. In an example, the security controller may be configured to analyze data stored in the persistent trust log, at least in part, by evaluating a digital signature to determine whether the data stored in the persistent trust log was written to the persistent trust log by the security controller. In an example, the security controller may be configured to analyze data stored in the persistent trust log, at least in part, by evaluating the data stored in the persistent trust log using one or more criteria included in a trust profile received with the trust assessment request. In an example, the security controller may be configured to analyze data stored in the persistent trust log, at least in part, by retrieving information from an external database regarding how one or more of the historic events influence the trust level of the computing device.

In an example, the security controller may be further configured to determine whether to respond to the trust assessment request by evaluating whether the trust assessment would reveal the historic events influencing the trust level of the computing device. In an example, the security controller may be further configured to determine whether to respond to the trust assessment request by evaluating an identity credential received with the trust assessment request. In an example, the security controller may be further configured to digitally sign the trust assessment with a timestamp prior to transmitting the trust assessment. In an example, the security controller may be further configured to digitally sign the trust assessment with an anonymous attestation credential prior to transmitting the trust assessment.

In another example, a method for asserting a trust level of a computing device may comprise receiving a trust assessment request originating from an external service, generating a trust assessment using a security engine of the computing device by analyzing data stored in a persistent trust log, and transmitting the trust assessment to the external service originating the trust assessment request.

In an example, the data stored in the persistent trust log may be modifiable only by the security engine. In an example, analyzing the data stored in the persistent trust log may comprise evaluating a digital signature to determine whether the data stored in the persistent trust log was written to the persistent trust log by the security engine. In an example, analyzing the data stored in the persistent trust log may comprise evaluating the data stored in the persistent trust log using one or more criteria included in a trust profile received from the external service originating the trust assessment request.

In an example, the data stored in the persistent trust log may relate to historic events influencing the trust level of the computing device. In an example, analyzing the data stored in the persistent trust log may comprise retrieving information from an external database regarding how one or more of the historic events influence the trust level of the computing device. In an example, generating the trust assessment using the security engine may comprise generating a trust assessment that does not reveal the historic events influencing the trust level of the computing device.

In an example, the method may further comprise determining whether to respond to the trust assessment request, prior to transmitting the trust assessment to the external service originating the trust assessment request, by evaluating whether the trust assessment would reveal the historic events influencing the trust level of the computing device. In an example, the method may further comprise determining whether to respond to the trust assessment request, prior to transmitting the trust assessment to the external service originating the trust assessment request, by evaluating an identity credential received from the external service originating the trust assessment request.

In an example, generating the trust assessment using the security engine may comprise digitally signing the trust assessment with a timestamp prior to transmitting the trust assessment to the external service originating the trust assessment request. In an example, generating the trust assessment using the security engine may comprise digitally signing the trust assessment with an anonymous attestation credential prior to transmitting the trust assessment to the external service originating the trust assessment request.

In yet another example, a method for monitoring a trust level of a computing device may comprise detecting an event that influences the trust level of the computing device, and writing data relating to the event to a persistent trust log using a security engine of the computing device.

In an example, data stored in the persistent trust log may be modifiable only by the security engine. In an example, writing the data relating to the event to the persistent trust log may comprise digitally signing the data relating to the event using a private key of the security engine. In an example, writing the data relating to the event to the persistent trust log may comprise encrypting the data relating to the event using a private key of the security engine. In an example, the persistent trust log may comprise data relating to historic events influencing the trust level of the computing device. In an example, the method may further comprise compressing the persistent trust log by replacing a portion of the data relating to historic events influencing the trust level of the computing device with a variable summarizing the portion of the data. In an example, the method may further comprise asserting the trust level of the computing device using the any of the methods described above.

In one example, a computing device having a trust level may comprise a security engine and a memory having stored therein a plurality of instructions that, when executed by the security engine, cause the computing device to perform any of the methods described above.

In another example, one or more machine readable storage media may comprise a plurality of instructions stored thereon that, in response to being executed, result in a computing device performing any of the methods described above.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device having a trust level, the computing device comprising:
   a memory having stored therein a persistent trust log, wherein the persistent trust log comprises data relating to historic events influencing the trust level of the computing device; and
   a security controller configured to (i) detect events that influence the trust level of the computing device, (ii) write data relating to the events to the persistent trust log, (iii) receive a trust assessment request that includes a trust profile from an external service that resides on a server external to the computing device, (iv) analyze the data in the persistent trust log, at least in part, using one or more criteria included in the trust profile, (v) generate a trust assessment based on the data analysis, and (vi) transmit the trust assessment to the external service.

2. The computing device of claim 1, wherein the memory is a dedicated memory device accessible only to the security controller.

3. The computing device of claim 1, wherein the security controller is further configured to digitally sign the data relating to the event using a private key when writing the data relating to the event to the persistent trust log.

4. The computing device of claim 1, wherein the security controller is configured to analyze data stored in the persistent trust log, at least in part, by evaluating a digital signature to determine whether the data stored in the persistent trust log was written to the persistent trust log by the security controller.

5. The computing device of claim 1, wherein the security controller is configured to analyze data stored in the persistent trust log, at least in part, by retrieving information from a database on the server external that indicates how one or more of the historic events influence the trust level of the computing device.

6. The computing device of claim 1, wherein the security controller is further configured to determine whether to respond to the trust assessment request by evaluating whether the trust assessment would reveal the historic events influencing the trust level of the computing device.

7. The computing device of claim 1, wherein the security controller is further configured to determine whether to respond to the trust assessment request by evaluating an identity credential received with the trust assessment request.

8. The computing device of claim 1, wherein the security controller is further configured to digitally sign the trust assessment with a timestamp prior to transmitting the trust assessment.

9. The computing device of claim 1, wherein the security controller is further configured to digitally sign the trust assessment with an anonymous attestation credential prior to transmitting the trust assessment.

10. A method for asserting a trust level of a computing device, the method comprising:
    receiving a trust assessment request including a trust profile from an external service residing on a server external to the computing device;
    analyzing, at a security engine of the computing device, data stored in a persistent trust log on the computing device based, at least in part, on one or more criteria included in the trust profile, wherein the data stored in the persistent trust log relates to historic events influencing the trust level of the computing device;
    generating, at the security engine, a trust assessment based on the data analysis; and
    transmitting, by the security engine, the trust assessment to the external service.

11. The method of claim 10, wherein analyzing the data stored in the persistent trust log comprises evaluating a digital signature to determine whether the data stored in the persistent trust log was written to the persistent trust log by the security engine.

12. The method of claim 10, wherein analyzing the data stored in the persistent trust log comprises retrieving information from a database residing on the server external to the computing device that indicates how one or more of the historic events influence the trust level of the computing device.

13. The method of claim 10, further comprising determining whether to respond to the trust assessment request, prior to transmitting the trust assessment to the external service originating the trust assessment request, by evaluating whether the trust assessment would reveal the historic events influencing the trust level of the computing device.

14. The method of claim 10, further comprising determining whether to respond to the trust assessment request, prior to transmitting the trust assessment to the external service originating the trust assessment request, by evaluating an identity credential received from the external service originating the trust assessment request.

15. The method of claim 10, wherein generating the trust assessment using the security engine comprises digitally signing the trust assessment with a timestamp prior to transmitting the trust assessment to the external service originating the trust assessment request.

16. The method of claim 10, wherein generating the trust assessment using the security engine comprises digitally signing the trust assessment with an anonymous attestation credential prior to transmitting the trust assessment to the external service originating the trust assessment request.

17. One or more non-transitory, machine readable storage media comprising a plurality of instructions stored thereon that, in response to being executed, result in a computing device:

receiving a trust assessment request including a trust profile from an external service residing on a server external to the computing device;

analyzing data stored in a persistent trust log on the computing device based on, at least in part, one or more criteria included in the trust profile, wherein the data stored in the persistent trust log relates to historic events influencing the trust level of the computing device;

generating a trust assessment based on the data analysis using a security engine of the computing device; and transmitting the trust assessment to the external.

18. The one or more non-transitory, machine readable storage media of claim 17, wherein the plurality of instructions result in the computing device analyzing the data stored in the persistent trust log, at least in part, by evaluating a digital signature to determine whether the data stored in the persistent trust log was written to the persistent trust log by the security engine.

19. The one or more non-transitory, machine readable storage media of claim 17, wherein the plurality of instructions result in the computing device analyzing the data stored in the persistent trust log, at least in part, by retrieving information from a database residing on the server external to the computing device, wherein the information indicates how one or more of the historic events influence the trust level of the computing device.

20. The one or more non-transitory, machine readable storage media of claim 17, wherein the plurality of instructions further result in the computing device determining whether to respond to the trust assessment request, prior to transmitting the trust assessment to the external service originating the trust assessment request, by evaluating whether the trust assessment would reveal the historic events influencing the trust level of the computing device.

21. The one or more non-transitory, machine readable storage media of claim 17, wherein the plurality of instructions further result in the computing device determining whether to respond to the trust assessment request, prior to transmitting the trust assessment to the external service originating the trust assessment request, by evaluating an identity credential received from the external service originating the trust assessment request.

22. The one or more non-transitory, machine readable storage media of claim 17, wherein the plurality of instructions further result in the computing device digitally signing the trust assessment with a timestamp prior to transmitting the trust assessment to the external service originating the trust assessment request.

23. The one or more non-transitory, machine readable storage media of claim 17, wherein the plurality of instructions further result in the computing device digitally signing the trust assessment with an anonymous attestation credential prior to transmitting the trust assessment to the external service originating the trust assessment request.

* * * * *